(12) United States Patent
DuRocher

(10) Patent No.: US 6,357,794 B1
(45) Date of Patent: Mar. 19, 2002

(54) STEERING ASSEMBLIES

(75) Inventor: Daniel J. DuRocher, Leonard, MI (US)

(73) Assignee: TRW LucasVarity Electric Steering Limited, West Midlands (GB)

( * ) Notice: Subject to any disclaimer, the term of this patent is extended or adjusted under 35 U.S.C. 154(b) by 0 days.

(21) Appl. No.: 09/485,264

(22) PCT Filed: Aug. 5, 1998

(86) PCT No.: PCT/GB98/02357

§ 371 Date: Apr. 13, 2000

§ 102(e) Date: Apr. 13, 2000

(87) PCT Pub. No.: WO99/07592

PCT Pub. Date: Feb. 18, 1999

(30) Foreign Application Priority Data

Aug. 8, 1997 (GB) ............................................. 9716747

(51) Int. Cl.⁷ ................................................. B62D 1/99
(52) U.S. Cl. ........................ 280/777; 280/775; 280/779
(58) Field of Search ................................ 280/775, 777, 280/779; 74/492, 493

(56) References Cited

U.S. PATENT DOCUMENTS

| 5,368,330 A | 11/1994 | Arnold et al. |
| 5,425,553 A | * 6/1995 | Yazane et al. ............... 280/777 |
| 5,511,823 A | 4/1996 | Yamaguchi et al. |
| 5,775,172 A | 7/1998 | Fevre et al. |

FOREIGN PATENT DOCUMENTS

| DE | 2657485 | 6/1978 |
| DE | 9207473 | 10/1992 |
| DE | 4138239 | 5/1993 |
| EP | 0705754 | 4/1996 |
| EP | 0755844 | 1/1997 |
| GB | 1351780 | 5/1974 |

* cited by examiner

Primary Examiner—Eric Culbreth
(74) Attorney, Agent, or Firm—Tarolli, Sundheim, Covell, Tummino & Szabo L.L.P.

(57) ABSTRACT

An energy absorbing steering column assembly is disclosed in which a steering column shaft (3a, 3b) is supported within a two part steering column housing. The two part housing comprises a first part (1) secured to the vehicle body and a second (2) part which is supported by the first part (1) and adapted to slide telescopically relative to the first part in an accident. A spring (5) is provided in a space between the two parts, and upon relative movement between the first and second part (1, 2), the spring (5) slides along at least one of the two parts to generate a friction force which provides a damping effect. An additional, separate embodiment is also disclosed in which the two part housing (1, 2) is fixed to the vehicle through an energy controlling mechanism (300, 400) which comprises a first portion which is "squeezed" along or through an opening on a second portion. Varying the cross section of the first portion as it passes through the opening in the second portion allows a predetermined damping force to be generated.

17 Claims, 3 Drawing Sheets

STEERING ASSEMBLIES

FIELD OF THE INVENTION

This invention relates to improvements in steering assemblies, and in particular but not exclusively to steering column assemblies for use in an electrical power assisted steering system for vehicles.

BACKGROUND OF THE INVENTION

It is known to provide a steering column shaft which transmits torque from a steering wheel to a steering mechanism for turning the roadwheels of a vehicle or such like. For example, the steering mechanism may comprise a rack and pinion whereby the steering column shaft is provided on one end with a toothed wheel which engages a portion of the rack mechanism. Alternative arrangements including re-circulating ball steering mechanisms are also known.

In order to retain the steering column shaft in the desired position it is common practice to encase, at least partially, a portion of the shaft with a steering column support. The steering column is supported within the support to allow rotational movement, and may be located with bearings at one or more points along its length.

Because of the typical location of the steering wheel in front of a driver of a vehicle such as a car or lorry, there is a high risk of injury in a collision caused by impact of the driver upon the wheel. In a worst case, the wheel may be pushed back towards a driver at the same time as the driver is thrown towards, such as in a heavy impact causing high deceleration.

To reduce the risk of injury, it is known to make the steering column support housing collapsible by providing a portion of reduced strength which may deform under load. The steering column shaft itself may also be deformable.

A problem arises when the length of the steering column shaft and the support is insufficient to allow the provision of an adequate sized portion of reduced strength. This situation arises in the case of a vehicle fitted with an electrical power assisted steering system in which a motor is adapted to apply an assistance torque to the steering column shaft in response to a measurement of the torque applied by the driver. Torque is typically measured using a dedicated torque sensor and the location of the torque sensor on the steering column shaft and the need for a portion of the shaft over which the motor engages via a worm wheel or the like reduces the available length of steering column support which can be made deformable.

In accordance to a first aspect of the invention, a steering column assembly for a vehicle comprises first and second telescopic support parts defining a housing, an energy absorbing member, and a steering column shaft adapted to support a steering wheel at one end and substantially enclosed within the housing, at least one of the support parts being attached to a part of the vehicle and the other one of the support parts being supported in a normal position relative to the first part and adapted so that in an accident the second part moves telescopically relative to the first part against a force determined by the energy absorbing member acting between said first and second parts.

In one embodiment, the energy absorbing member may be deformed when the second part moves telescopically relative to the first part. The deformation may produce a reaction force which may resist relative movement between the first and second parts.

By the present invention, the need for a portion of reduced strength is eliminated. The first and second support parts may be of substantially rigid construction, and movement of the first and second support part relative to one another against the force of the energy absorbing member allows the housing to telescopically collapse in a controlled manner. Of course, a portion of reduced strength could be provided as well.

Preferably, the energy absorbing member comprises a compression spring which is located between the first support part and the second support part. The spring may comprise a flat wavy spring which may exert a radially directed force between the first support part and second support parts. This force generates friction between the spring and at least one of the first and second parts when they move telescopically relative to each other. The friction force can be adjusted by providing a more resilient wavy spring. Alternatively, using an identical spring but making the gap between the first and second support parts smaller will cause the wavy spring to be "flattened" to a greater extent which will also increase the force. The spring need not deform when the two parts move relative to each other, and may be fixed relative to one of the parts.

At least one of the first and second support parts may each comprise an elongate U-shaped channel member having a base and a pair of side walls. The first part may be fixed relative to a part of the vehicle with the mouth of the channel facing downwards whilst the side walls of the second part may be adapted to engage the side walls of the first support part with the mouth of the second channel facing upwards. Of course, the two support parts could be arranged the other way. The two parts may be adapted to slide relative to one another by providing a groove in one part and a co-operating rail on the other part.

The first support part and the second support may be fixed to the vehicle through a mounting bracket. A frangible fastening means such as bolts having a weakened portion of plastics material may be used to fix the bracket to the vehicle which are adapted to break off under high loads. In an alternative, only the second part may be fixed to the vehicle through a mounting bracket with the second part at least partially supporting the first part.

The provision of the frangible fastening means provides additional safety as it allows the steering column assembly to break away from the vehicle. The mounting bracket may in turn be fastened to the vehicle through separate brackets which are also adapted to break in an accident.

The steering column shaft may also be telescopic, comprising at least a first and second portion adapted to move axially relative to one another at least when the first and second support parts move relative to one another.

Means may be provided for allowing the height of the steering column assembly to be adjusted. This may comprise a lever and cam mechanism for allowing relative movement between the first and second support parts and the mounting bracket.

A steering lock assembly may be provided on a portion of the first part. The lock assembly may comprise a locking portion adapted to engage with a part of the steering column shaft to substantially prevent rotation of the steering columns relative to the support part(s). It may be adapted to freely slide past the second part when the first part telescopes relative to the second part.

The steering column may further be adapted to allow movement of the steering wheel relative to the driver by lengthening or shortening the steering column assembly. It is envisaged that this could be achieved by making at least one of the first and second supports parts from two subsections which can move telescopically relative to one another. A locking lever may be provided which allows the driver to adjust the steering wheel when the locking lever is in its unlocked position but fixes the steering column assembly position when in its locked position.

The first one of the first support part and second support parts may be provided with one or more rails which are adapted to slide within one or more guides provided in the other one of the first and second support parts. Preferably, one of the support parts is provided with a first and second guide rail arranged in parallel. Each of the first and second guide rails may be adapted to co-operate with a corresponding guide channel in the other support parts. The first one of the guide rails and the corresponding guide channel may comprise interengaging co-operating non-planar location surfaces (suitably Vee shaped), whilst the second guide rail and its corresponding guide channel may comprise planar co-operating surfaces to provide free play between the second rail and its channel. Thus, the first guide rail and channel provide accurate location of the first part relative to the second part whilst the free play between the second rail and channel ensure that tolerances in the relative spacing between the two rails (or the two channels) is not critical. If no free-play is provided, the spacing between the rails and/or channels would need to be tightly controlled.

Preferably, plastic or other material may be injected into at least part of the space between the first and second parts of the steering shaft to take up any free play between the two parts. The material may be adapted to readily break when the first part is moved relative to the second part. In an alternate, a mechanical spring means may be provided.

BRIEF DESCRIPTION OF THE DRAWINGS

There will now be described by way of example only several embodiments of the present invention with reference to the accompanying drawings in which.

DESCRIPTION OF AN EXAMPLE EMBODIMENT

Figure 1:
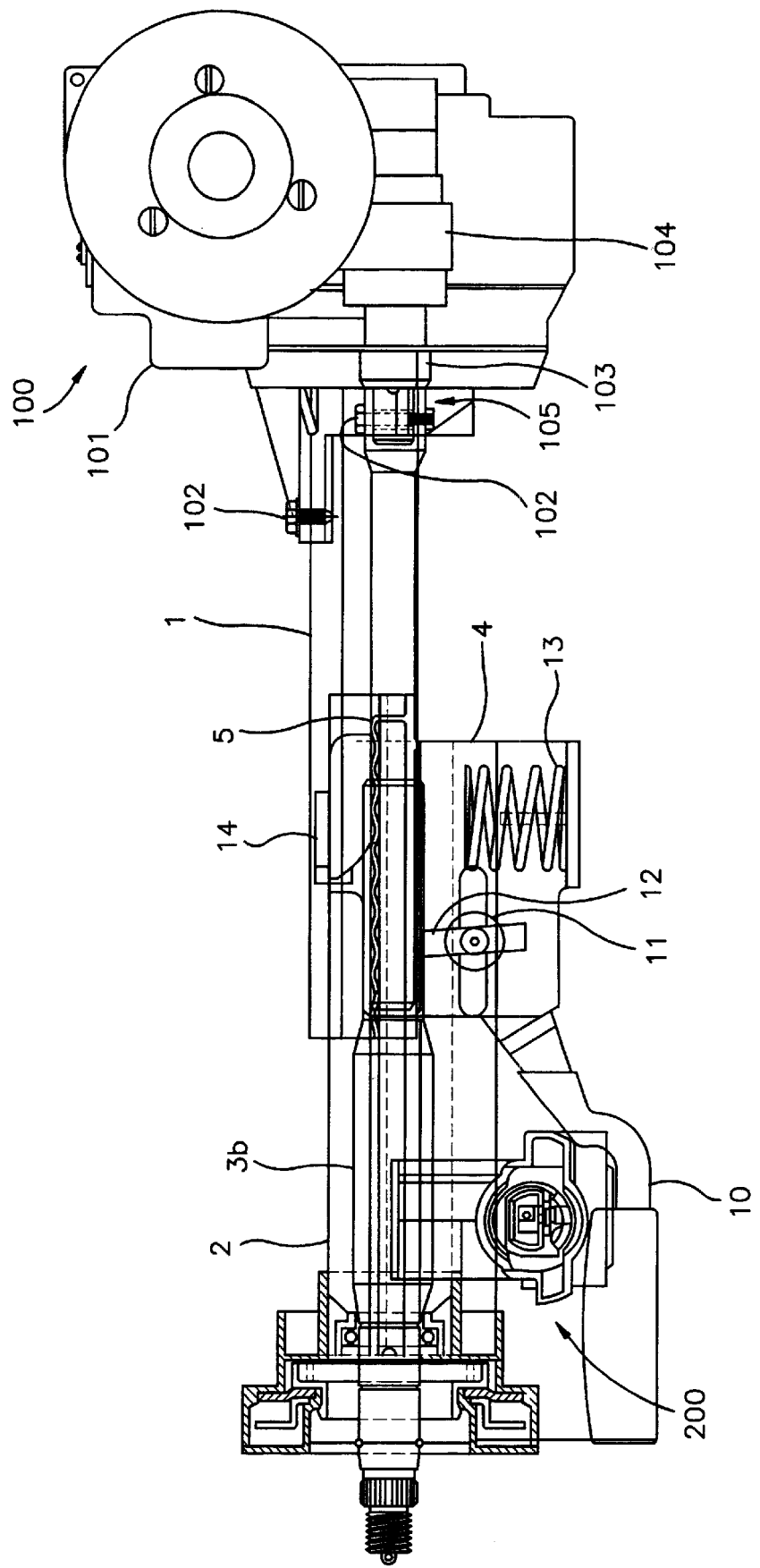
FIG. 1 is a side view of one embodiment of a steering column assembly for a vehicle.
Figure 2:
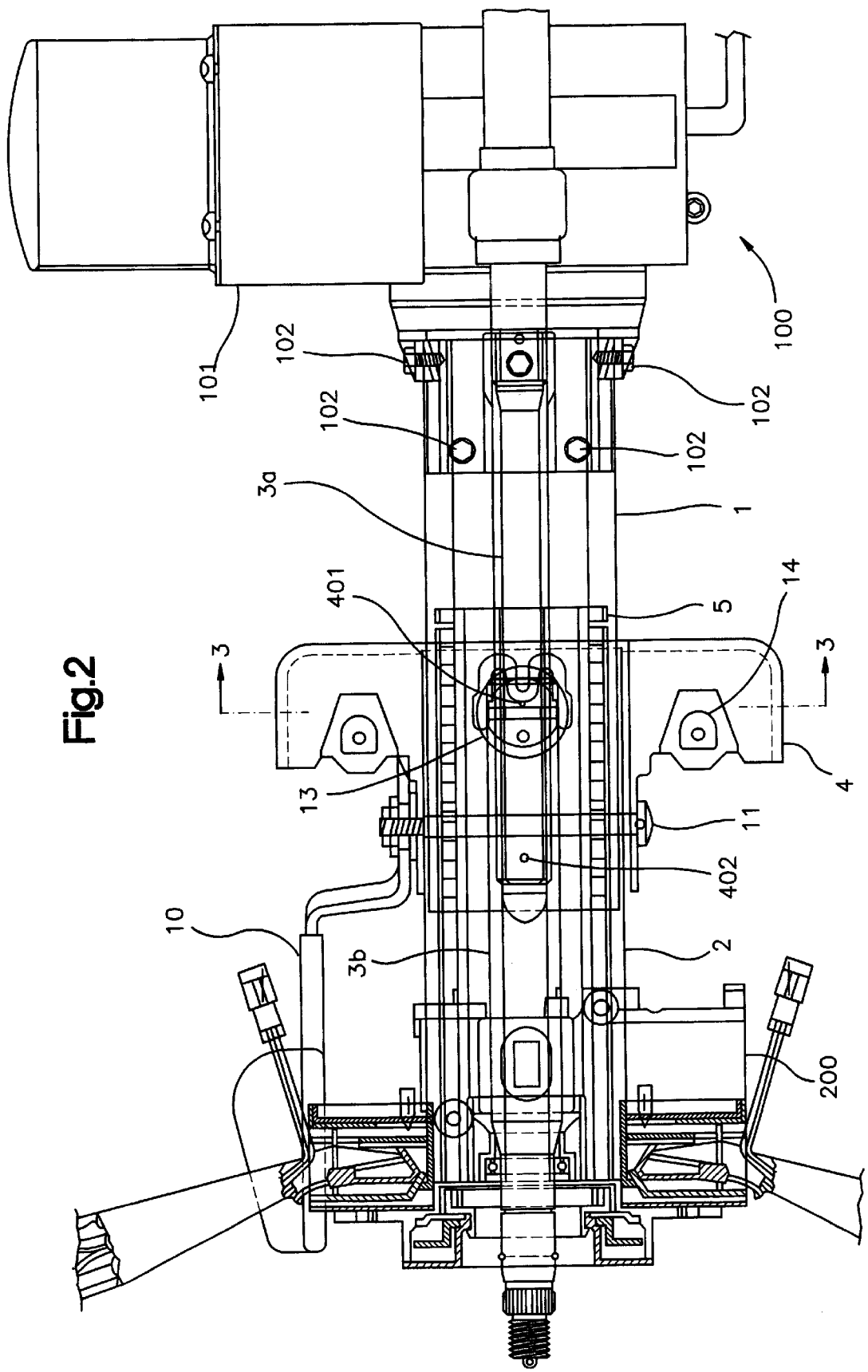
FIG. 2 in an overhead view of the steering column assembly illustrated in FIG. 1.

FIGS. 1 and 2 of the accompanying drawings show one embodiment of a steering column assembly.

The steering column assembly comprises an elongate first support part 1 and a second support part 2 which together constitute a housing forming a shroud for a two-part steering column shaft 3a, 3b. Relative movement between the two parts of the steering shaft is prevented by injecting plastics material between the two parts through holes 401, 402. The plastic can be readily broken to allow relative movement in an accident. The steering column support parts 1, 2 are fixed relative to the vehicle (not shown) through a mounting bracket 4 provided near a point approximately midway along the length of steering column shaft.

Figure 3:
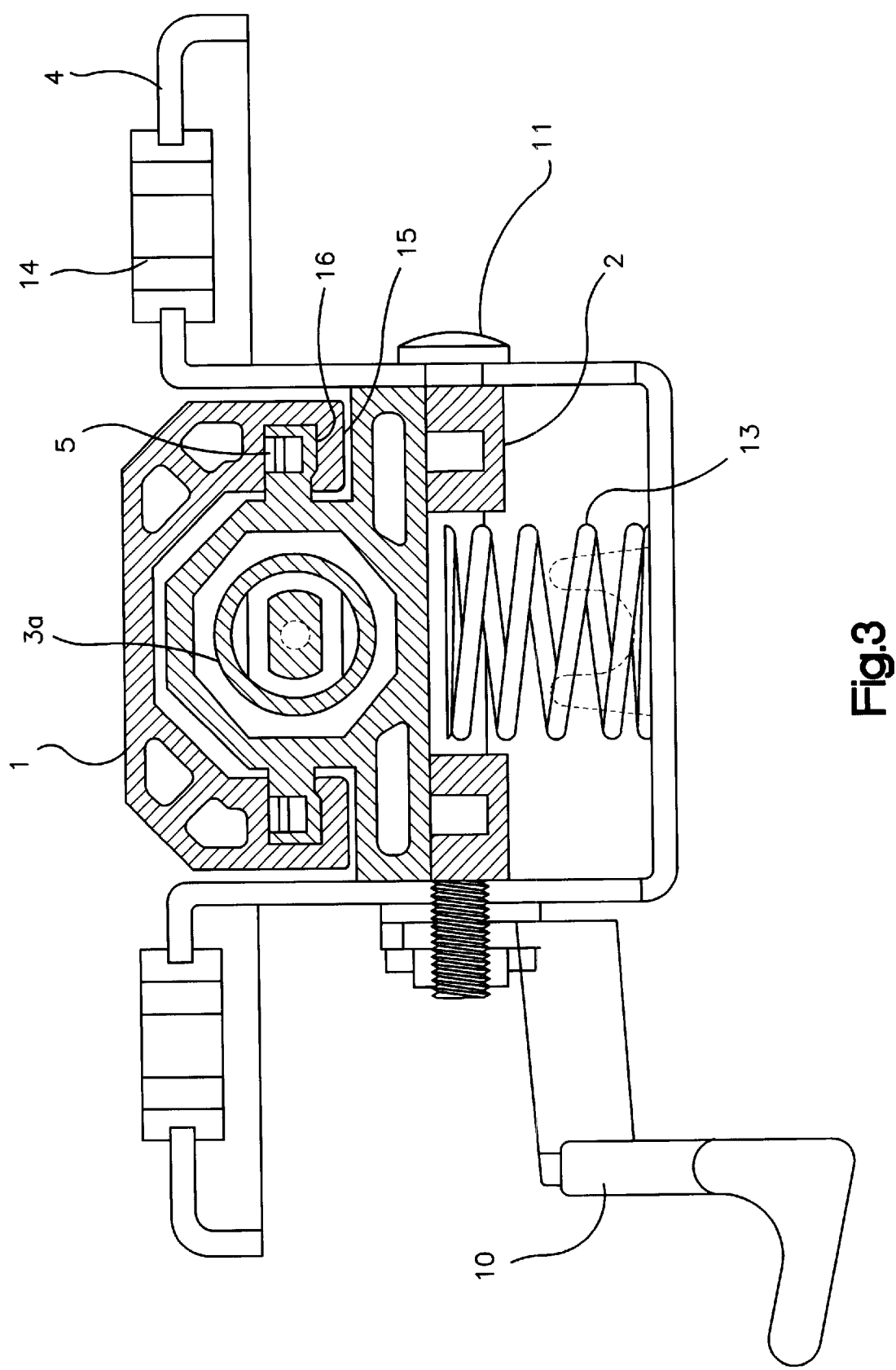
FIG. 3 shows a cross section of the assembly of FIG. 2 taken about the line 3—3 in FIG. 2.

Each of the first and second support parts 1,2 comprises an elongate rigid member of a U-shaped cross section as shown in FIG. 3. A guide channel 15 is provided on the inside of each of the side walls of the first portion 1 and a protruding guide rail 16 is provided along the outside of the side walls of the second portion. Of course, this could be reversed. The width of the second portion in cross-section is slightly smaller than that of the first portion and an end of the second portion is slid into an end of the first portion with the protruding guide rails 16 co-operating with the guide channels 15. One of the guide rails has a partially V-shaped cross section to provide accurate radial location between the first and second part. The other rail is adapted to have a planar sliding surface which co-operates with its respective guide channel. This planar surface engagement provides a way of ensuring that the tolerances on the spacing between the first and second rails and/or guide channels is not critical.

With the first and second portions 1, 2 in sliding co-operation the steering column shaft 3a, 3b, is mounted within the U-shaped channels, a bearing being provided at the free end of the second portion for supporting the shaft. The free end of the first portion 1 is rigidly attached by bolts 102 to a housing 101 for the component parts of an electric power steering system 100. The housing contains an electric motor which transmits torque through a gearbox to a portion of the steering assembly. A torque sensor 104 is provided on a portion of shaft 103 provided axially relative to the steering column shaft which provides a measure of torque which can be used as a control variable for the motor. The portion of shaft 103 is attached to the column shaft through a universal joint 105.

A flat metal sheet formed into a wavy spring 5 is provided between the first support portion 1 and the second portion 2. The wavy spring 5 provides a means for locating the first portion 1 at a fixed position relative to the second portion 2. The spring 5 is adapted so that it exerts a compressive force between the first and second parts at a normal to the main axis of the steering column assembly. Thus, compression of the steering column which would cause the second portion 2 to slide telescopically into the first portion 1 is resisted by a friction force generated by the wavy spring 5. This friction force generated as the steering assembly is compressed provides a controlled reaction to forces causing the steering column to collapse such as the weight of a driver acting upon the column through a steering wheel in an accident.

The second portion 2 is attached to the mounting bracket 4 using a lever 10 and cam 11 which works in a slot 12 in the bracket 4. This allows the driver to move the steering column relative to the bracket, for instance to vary the height of the steering wheel. A biasing spring 13 is provided to support at least part of the weight of the column to assist in raising the column. The mounting bracket 4 is attached to the vehicle using a pair of frangible fastening mechanisms 14 on the mounting bracket 4. Each mechanism comprises a bolt having a weakened plastics shear-off portion which allows the connection to break under load which in turn allows free movement of the mounting bracket, and hence second portion of the steering column, relative to the vehicle mounting point.

A steering lock assembly 200 is provided on the second support portion 2 to allow the steering column shaft to be locked relative to the second steering column portion when the vehicle is not in use. The assembly is adapted so that it does not impede relative movement between the two telescoping parts of the assembly.

The steering column assembly shown in FIGS. 1 to 3 provides for movement of the steering column from its normal position (as shown in the Figures) to a telescopically collapsed position if a load is applied to the steering wheel along the axis of the steering column shaft. The first and second support portions 1,2 telescope together against a reaction force provided by the wavy spring 5 which helps to absorb loads applied to the steering column. The force required to move the first and second parts relative to one another can be adjusted by changing the characteristics of the wavy spring.

It will be understood that the invention is not limited to the embodiments described herein with reference to the accompanying drawings. In particular, other shapes for the first and second support part are envisaged. The channels and rails in the side walls may be reversed (i.e. channels in the first part and rails in the second), or some other arrangement which facilitates a telescopic movement of the two parts could be provided.

From the above description of the invention, those skilled in the art will perceive improvements, changes and modifications. Such improvements, changes and modifications within the skill of the art are intended to be covered by the appended claims.

Having described the invention, the following is claimed:

1. A steering column assembly for a vehicle having a steering wheel comprising first and second telescopic supports parts defining a housing, an energy absorbing member, and a steering column shaft adapted to support said steering wheel at one end, at least one of the support parts being attached to a part of the vehicle and the other one of the support parts being supported in a normal position relative to the first part and adapted so that said second part can move telescopically relative to said first part against a force determined by said energy absorbing member acting between said first and second parts, wherein at least one of said first and second support parts comprises an elongate member having a base and a pair of side walls and said first and second parts are adapted to slide relative to one another by means of a groove in one of said parts and a co-operating rail on the other of said parts.

2. A steering column assembly according to claim 1 wherein one of said support parts is provided with a first guide rail and a second guide rail in parallel, each said rail being adapted to co-operate with a corresponding guide channel in the said other support part.

3. A steering column assembly according to claim 2 wherein a first one of said guide rails and the said corresponding guide channel comprise interengaging co-operating non-planar location surfaces, said second guide rail and said corresponding guide channel thereof comprising planar-co-operating location surfaces to provide free-play between said second rail and said co-operating channel.

4. A steering column assembly according to claim 3 wherein said first channel has a substantially V-shaped section.

5. A steering column assembly according to claim 1 wherein said first part is adapted to move relative to said second part in the event of an accident.

6. A steering column according to claim 1, wherein said first part and said second support parts are of substantially rigid construction, and movement of said first and second support parts relative to each other against the force of said energy absorbing member allows said housing to collapse telescopically in a controlled manner.

7. A steering column assembly according to claim 1, wherein said energy absorbing member comprises a compression spring located between said first support part and said second support part.

8. A steering column assembly according to claim 1, wherein said energy absorbing member comprises a flat wavy spring which exerts a force between said first support part and said second support part.

9. A steering column assembly according to claim 1, wherein said elongate member is of U-shaped channel outline.

10. A steering column assembly according to claim 1, wherein said first support part and said second support part are fixed to the vehicle by a mounting bracket through a frangible fastening means.

11. A steering column assembly according to claim 1, wherein said steering column shaft is telescopic, comprising at least a first portion and a second portion adapted to move axially relative to one another at least when said first and second support parts move relative to each other.

12. A steering column assembly according to claim 1, wherein means are provided for allowing the height of the steering column assembly to be adjusted.

13. A steering column assembly according to claim 1, wherein a steering lock assembly is provided on a portion of said first part, and said first part is adapted to freely slide past said second part when said first part telescopes relative to said second part.

14. A steering column assembly according to claim 1, wherein said assembly is adapted to allow movement of said steering wheel relative to the driver by lengthening and shortening said steering column assembly itself.

15. A steering column assembly according to claim 1, wherein one of said support parts is provided with a first and second guide rail arranged in parallel, each of said first and second guide rails being adapted to co-operate with a corresponding guide channel in said other support parts, said first one of said guide rails and said co-operating guide channel comprising interengaging co-operating non-planar location surfaces, and wherein said second guide rail and said corresponding guide channel thereof comprise planar co-operating surfaces to provide free play between said second rail and said channel thereof.

16. A steering column assembly according to claim 1, wherein plastic or other synthetic material is injected into at least part of a space between said first and second parts of said steering shaft to take up any free play between the said two parts.

17. An electrical power assisted steering system incorporating a steering column assembly having a steering wheel, wherein said steering column assembly comprises first and second telescopic support parts defining a housing, an energy absorbing member, and a steering column shaft adapted to support said steering wheel at one end, at least one of the support parts being attached to a part of the vehicle and the other one of the support parts being supported in a normal position relative to the first part and adapted so that said second part can move telescopically relative to said first part against a force determined by said energy absorbing member acting between said first and second parts, wherein at least one of said first and second support parts comprises an elongate member having a base and a pair of side walls and said first and second parts are adapted to slide relative to one another by means of a groove in one of said parts and a co-operating rail on the other of said parts.

* * * * *